(12) United States Patent
Bettonvil et al.

(10) Patent No.: US 12,441,664 B2
(45) Date of Patent: Oct. 14, 2025

(54) METHOD FOR MANUFACTURING A LAYERED TILE AND A PRODUCT OBTAINED WITH SAID METHOD

(71) Applicant: MBI GROUP B.V., Veghel (NL)

(72) Inventors: Marcelis Martinus Johannes Henry Bettonvil, Veghel (NL); Wilhelmus Antonius Gerardes Mollink, Veghel (NL)

(73) Assignee: MBI GROUP B.V., Veghel (NL)

( * ) Notice: Subject to any disclaimer, the term of this patent is extended or adjusted under 35 U.S.C. 154(b) by 207 days.

(21) Appl. No.: 16/989,503

(22) Filed: Aug. 10, 2020

(65) Prior Publication Data

US 2020/0369575 A1 Nov. 26, 2020

Related U.S. Application Data

(63) Continuation of application No. 15/197,427, filed on Jun. 29, 2016, now Pat. No. 10,737,985.

(30) Foreign Application Priority Data

Jun. 29, 2015 (EP) ..................... 15174326

(51) Int. Cl.
*C04B 37/00* (2006.01)
*B28B 19/00* (2006.01)
(Continued)

(52) U.S. Cl.
CPC ........ *C04B 37/008* (2013.01); *B28B 19/0053* (2013.01); *B32B 7/12* (2013.01);
(Continued)

(58) Field of Classification Search
CPC ....... C04B 37/008; C04B 28/02; C04B 28/04; C04B 2111/00612; C04B 2237/32;
(Continued)

(56) References Cited

U.S. PATENT DOCUMENTS

| 1,539,148 | A | 5/1925 | Sylvester |
| 4,599,841 | A | 7/1986 | Haid |

(Continued)

FOREIGN PATENT DOCUMENTS

| DE | 4232751 A1 * | 5/1994 | ......... C04B 41/5024 |
| EP | 2172330 | 4/2010 | |

(Continued)

OTHER PUBLICATIONS

[NPL-1] Hagenah (DE 4232751 A1), May 19, 1994 (EPO machine translation to English). (Year: 1994).*

(Continued)

*Primary Examiner* — Frank J Vineis
*Assistant Examiner* — Donald M Flores, Jr.
(74) *Attorney, Agent, or Firm* — Peacock Law P.C.; Justin R. Jackson; Janeen Vilven

(57) ABSTRACT

A method for manufacturing a layered tile comprising a mutually connected ceramic tile and a concrete body, the method comprising the steps of applying an organic primer to a first surface of the ceramic tile, optionally positioning the ceramic tile in a mold, exposing the first surface, applying a concrete mixture on top of the tile's first surface, pre-hardening the concrete mixture for obtaining a green product, removing the product from the mold, and fully hardening the concrete for obtaining the layered tile.

20 Claims, 1 Drawing Sheet

(51) Int. Cl.
  *B32B 7/12*    (2006.01)
  *B32B 9/00*    (2006.01)
  *B32B 13/04*   (2006.01)
  *C04B 28/02*   (2006.01)
  *C04B 28/04*   (2006.01)
  *B28B 7/00*    (2006.01)
  *C04B 111/00*  (2006.01)

(52) U.S. Cl.
  CPC .............. *B32B 9/005* (2013.01); *B32B 13/04* (2013.01); *C04B 28/02* (2013.01); *C04B 28/04* (2013.01); *B28B 7/0082* (2013.01); *B32B 2255/26* (2013.01); *B32B 2264/10* (2013.01); *B32B 2307/536* (2013.01); *B32B 2307/718* (2013.01); *B32B 2419/04* (2013.01); *C04B 2111/00612* (2013.01); *C04B 2237/32* (2013.01); *Y02W 30/91* (2015.05)

(58) Field of Classification Search
  CPC ..... B28B 19/0053; B28B 7/0082; B32B 7/12; B32B 9/005; B32B 13/04; B32B 2255/26; B32B 2264/10; B32B 2307/536; B32B 2307/718; B32B 2419/04; Y02W 30/91; Y10T 428/166
  See application file for complete search history.

(56) References Cited

U.S. PATENT DOCUMENTS

| | | | |
|---|---|---|---|
| 4,993,208 A | | 2/1991 | Bard et al. |
| 4,995,932 A | * | 2/1991 | Yoshida ................. B28B 11/00 264/228 |
| 5,887,389 A | | 3/1999 | Light et al. |
| 8,617,308 B1 | | 12/2013 | Douglas et al. |
| 2008/0209831 A1 | | 9/2008 | Rinsche |
| 2010/0237158 A1 | * | 9/2010 | Hou ....................... C04B 28/08 238/264 |
| 2010/0263323 A1 | | 10/2010 | Trinidade et al. |
| 2011/0146200 A1 | | 6/2011 | Dang |
| 2011/0268953 A1 | * | 11/2011 | Sorger .................... C04B 28/02 428/220 |
| 2014/0197563 A1 | | 7/2014 | Niven et al. |
| 2014/0342147 A1 | * | 11/2014 | Hilgenbrink ........ E04F 15/0215 428/335 |
| 2016/0375662 A1 | | 12/2016 | Bettonvil et al. |

FOREIGN PATENT DOCUMENTS

| | | | |
|---|---|---|---|
| EP | 3231784 | | 10/2017 |
| GB | 1124642 | | 8/1968 |
| GB | 2285948 | | 8/1995 |
| JP | H09323310 | | 12/1997 |
| JP | H10018551 | | 1/1998 |
| JP | H10037441 | | 2/1998 |
| JP | 2008-223406 | | 9/2008 |
| KR | 0887939 | | 3/2009 |
| WO | 96/31656 | | 10/1996 |
| WO | WO-9707303 A1 | * | 2/1997 ............. E04F 21/20 |

OTHER PUBLICATIONS

[NPL-2] "What is the size of coarse sand, medium sand, and fine sand?"; Longzhong Machinery (Mar. 2, 2023), <https://www.lzzgchina.com/news/what-is-the-size-of-coarse-sandmedium-sand-and-fine-sand.html>. (Year: 2023).*

* cited by examiner

METHOD FOR MANUFACTURING A LAYERED TILE AND A PRODUCT OBTAINED WITH SAID METHOD

CROSS-REFERENCE TO RELATED APPLICATIONS

This application is a continuation of U.S. patent application Ser. No. 15/197,427, entitled "A Method for Manufacturing a Layered Tile and a Product Obtained with Said Method", filed on Jun. 29, 2016, which claims priority to and the benefit of European Patent Application No. EP15174326.7, filed on Jun. 29, 2015, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The present invention relates to a method for manufacturing a layered tile.

Description of Related Art

To a limited extent, the application of ceramic tiles in gardens and on terraces is known in the art. Theoretically, layered tiles as indicated above have excellent properties, because of a combination of highly attractive appearance due to the ceramic tile and high strength due to the concrete body.

However, these known ceramic tiles do not withstand temperature and humidity fluctuations. It has shown that ceramic tiles suffer from fracture and deterioration when used outdoors. Also, it is hard to build a flat terrace with a sufficient stable base layer so as to prevent the ceramic tiles from breaking. As a consequence, for outdoor use these known ceramic tiles are not available on the market in a large scale.

As a consequence, there is a need for an improved manufacturing method for layered tiles, more in particular layered tiles that are comprised of a ceramic upper layer and a concrete body.

BRIEF SUMMARY OF THE INVENTION

The present invention relates to a method for manufacturing a layered tile comprising a mutually connected ceramic tile and a concrete body, said method comprising the steps of: applying an organic primer to a first surface of said ceramic tile, optionally positioning said ceramic tile in a mold, exposing said first surface, applying a concrete mixture on top of said tile's first surface, pre-hardening said concrete mixture for obtaining a green product, removing said product from the mold, and fully hardening said concrete for obtaining said layered tile.

The invention also relates to a tile, comprising a mutually connected ceramic tile and a concrete body, said tile and concrete body being connected through an organic primer.

The invention therefore aims at providing a manufacturing method for a layered tile, also indicated as sandwich tile, comprised of a ceramic tile and a concrete body. According to the present invention, the term "layered tile" or "sandwich tile" relates to the product obtained with the method according to the present invention, whereas the term "tile" relates to the "ceramic tile" that forms part of the "layered tile" according to the present invention.

The invention especially aims at providing a layered tile that has an optimum adhesion strength between ceramic tile and concrete body.

The invention also aims at providing an improved layered tile, obtained from a ceramic tile and a concrete body.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 2:
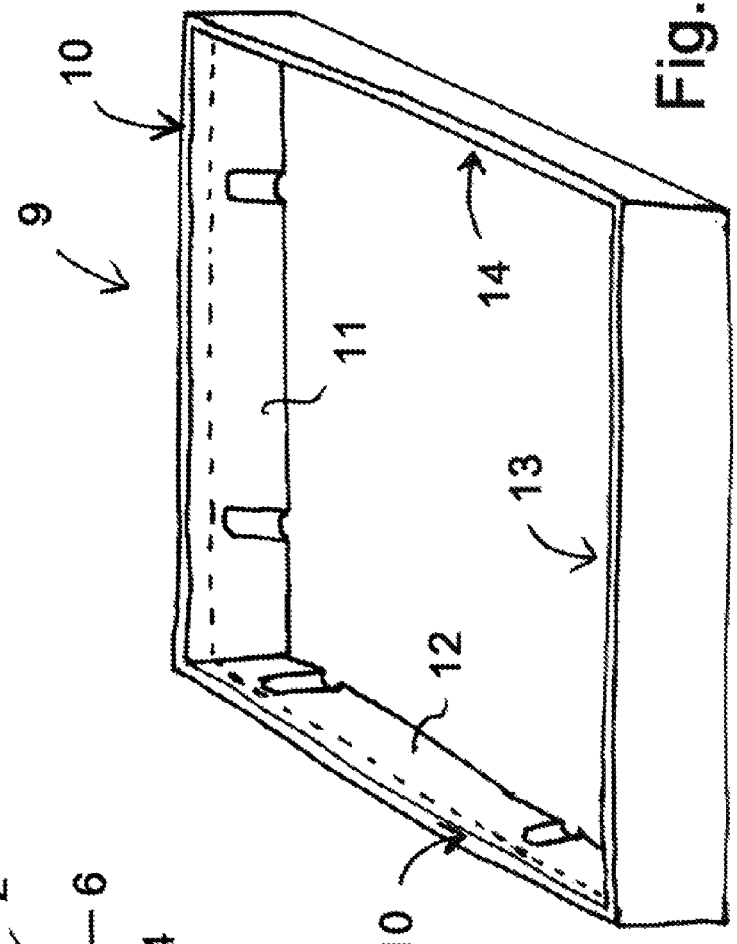
FIG. 2 shows a simplified mold for manufacturing a tile according to the invention.

So as to obtain at least one of the goals mentioned above, the present invention provides a method comprising the steps of claim 1. This manufacturing method has the advantage that a layered tile provides excellent adhesion strength between the ceramic tile and the concrete body.

It has unexpectedly shown that the layered tile according to the present invention is substantially completely resistant to moisture and temperature fluctuations.

Preferred embodiments of the present invention will be dis-cussed hereafter.

It has shown that a method comprising the step of compacting said concrete after applying same to the mold increases the structural integrity of the layered tile according to the invention. However, it has unexpectedly shown that the adherence of the concrete and the ceramic tile is improved as well by this method step.

Applying a concrete with an open structure unexpectedly increases the durability of the tile, probably due to improved drain characteristics of the layered tile.

It has shown that is especially preferred for said primer to be comprised of a polymeric substance, which increases the bond strength of the ceramic tile and the concrete.

Said polymeric substance of said primer is more preferably comprised of a styrene butadiene or a polyurethane polymer.

So as to obtain an optimal wetting of said ceramic tile, it is preferred that said primer is applied as such or as a liquid dispersion comprising a Portland cement, which increases the bind strength of the ceramic tile and said concrete body. Preferably said primer comprises from 0 weight % Portland cement to 75 weight % Portland cement, preferably from 10 weight % Portland cement to 60 weight % Portland cement (amount of Portland cement with respect to the weight of the primer). Such range pro-vides optimum results both in durability and bond strength.

An even further enhanced bond strength is surprisingly obtained by adding quartz sand to said primer, optionally also comprising Portland cement in an amount as stated above. The dimensions of quartz sand added to said primer is preferably in the range of up to 1 mm.

Said concrete mixture may comprise as an aggregate at least one of sand, granulate, cement and blast furnace slag. As a preferred embodiment said concrete comprises a combination of at least two of said aggregates, more preferably three of these aggregates, and most preferably all of these aggregates.

According to a preferred embodiment of the present invention, said sand has an average particle size of maximally 4 mm, said granulate has an average particle size of between 2 and 8 mm. Said cement has an average particle size as commonly used; the same applies to the average particle size of said blast furnace slag. This counts both for a case where only one or a limited number of aggregates is used and in the case where all four aggregates are used.

According to a further preferred embodiment, the invention relates to a method wherein said concrete mixture comprises sand in an amount of between 15 and 30%, preferably between 20 and 25%; comprises said granulate in an amount of between 55 and 75%, preferably between 62 and 69%; comprises said cement in an amount of between 4 and 12%, preferably between 6 and 10%; and comprises said blast furnace slag in an amount of between 2 and 6%, preferably between 3 and 5%; all % calculated on weight basis.

A highly preferred method is comprised of the steps of densifying said concrete mixture before same is hardened, applying a pressure of at least 2 bar, preferably at least 2.5 bar, preferably in combination with a vibration movement of said concrete. Preferably, said step of densifying the concrete mixture is as short as possible while obtaining a maximally densified mixture, for example only a few seconds. However, when applying the pressure as mentioned above, said step is preferably performed for maximally 30 seconds, preferably maximally 20 seconds, more preferably maximally 10 seconds. This produces a highly stable and durable layered tile.

So as to ensure that any concrete mixture does not enter any gaps between the ceramic tile and the mold's side walls, which might pollute the ceramic tile's top surface, it is preferred that the method comprises the step of applying a non-liquid concrete mixture. The term "non-liquid" means that the concrete mixture has such a consistency that within the time required for setting or hardening out, it does not substantially change its shape without active outside interference. Such behavior is also known by the term "non-flowing characteristics". A man skilled in the art of concrete technology is easily able to determine what concrete mixture fulfills such requirement. Surprisingly, it has shown that applying such non-liquid mixture provides a sufficient bonding between the concrete body and the ceramic tile. It was expected that an optimum bonding could only be obtained by applying a liquid mixture so as to obtain a maximum wetting of the ceramic tile's surface. It was even more surprising that the non-liquid mixture yields a remarkable, even sensational, ability to withstand temperature fluctuations and winter conditions. Applying a concrete mixture with an open character improves these characteristics even further.

According to a further embodiment, the invention relates to a layered tile, comprising a mutually connected ceramic tile and a concrete body, said tile and concrete body being connected through an organic primer.

Preferably, in said layered tile, said primer comprises a polymeric substance, preferably chosen from a styrene butadiene or a polyurethane polymer.

Hereafter, the invention will be discussed with reference to a manufacturing method.

According to the method of the present invention, a ceramic tile is provide with an adhesive, hereafter indicated as primer. Said primer is applied at the side to which a concrete mass will be added. Hence, the primer will be added to the bottom side of the ceramic tile. The side not provided with primer is the, when in use, visible or top side of the ceramic tile. Said primer should be capable of providing a coupling of a ceramic material and a (solid) concrete mass. Said primer may be applied manually or automatically, for example by means of spraying, rolling, or any other suitable means.

The ceramic tile is then positioned in a mold. The ceramic tile's bottom side is facing upwards whereas said top side is facing the bottom of the mold, said mold preferably being provided with a cushioning material so as to not damage the ceramic tile's top side. For example, a rubber material may be used, such as a polyurethane material or any kind of foamed rubber or rubber like material. It is preferred that said ceramic tile is evenly supported at its full top surface by said cushioning material.

The ceramic tile should closely fit inside said mold. As a matter of fact, the side walls of said mold may be provided with a compressible material so as to ensure that said ceramic tile is closely sealed at all edges.

Preferably, the layered tile's side walls are at least at part of their circumference somewhat wider than the dimension of the ceramic tile. This ensures that the concrete body of the layered tile protrudes at least partly beyond the side edges of the ceramic tile. Preferably, the concrete body protrudes at least partly beyond all edges of said ceramic tile. Such yields a layered tile that can be easily laid side by side without damaging the ceramic layer. The concrete bodies of adjacent tiles contact each other at said protruding portion, whereas the ceramic tiles are spaced apart. This also provides room for a pointing mortar or the like between adjacent tiles.

Said protrusions may preferably be comprised of spacers at at least one side wall of a concrete body, preferably at at least two or even three side walls, more preferably at all side walls of said concrete body. Although a single protrusion, also identified as spacer, may be applied, it is preferred that at least two spacers are provided since such eases laying the tiles. Therefore, it is preferred that each tile is provided with spacers at at least two portions of each side wall of a concrete body. As a consequence, it is preferred that the mold is embodied for providing spacers at the side edges of the concrete body. To this end, the mold may comprise at least one, preferably at least two, cavities at its side walls.

Hence, the invention also relates to a layered tile obtained according to the method of the present invention, comprising a spacer at a side wall of said concrete body extending outside a circumference of said ceramic tile. In addition to the fact that an attractive appearance is obtained since all layered tiles, more in particular the visible ceramic tiles, are spaced equally, optimum water drainage is obtained. A spacer protruding maximally 5 mm is sufficient, whereas a maximum of 3.5 mm or even 2.5 mm yields excellent results, both in water drainage and appearance.

Then, a concrete material is poured on said ceramic tile's bottom side, which, as mentioned above, is facing upwards inside said mold. For example, said concrete may be added so as to obtain a concrete layer of between 1 and 10 cm, preferably between 3 and 8 cm.

Subsequently, said concrete is compressed before it is hardened. Said compression may be comprised of a common compression step as used in practice.

However, so as to obtain optimum results, it is preferred that said compression step comprises a combination of vertical vibration movements in subsequent steps. A vibration motor is preferably set at 4000 rpm.

Said concrete mass preferably comprises aggregates. Positive results were obtained when using aggregates chosen from at least one of sand, granulate, cement and blast furnace slag. A combination of two or three of these aggregates provides better results, whereas best results were obtained when using all four of these aggregates.

A lightweight concrete product may be obtained by means of the method according to the invention as well. For example, an advantageous product is obtained by applying as a (course) granulate so-called Liapor in a dimension range of from 2 to 4 mm or by applying so-called Lava in a dimension range of from 4 to 8 mm.

Especially optimum results are obtained when applying a concrete mixture comprising sand in an amount of between 15 and 30%, preferably between 20 and 25%; comprising said granulate in an amount of between 55 and 75%, preferably between 62 and 69%; comprising said cement in an amount of between 4 and 12%, preferably between 6 and 10%; and comprising said blast furnace slag in an amount of between 2 and 6%, preferably between 3 and 5%; all % calculated on weight basis. Such combination of materials yields a layered tile that has an excellent bonding between said ceramic tile and said concrete mass and an extremely high durability.

In the manufacturing methods when testing the concrete composition, said sand has an average particle size of maximally 4 mm, said granulate has an average particle size of between 2 and 8 mm. Said cement has an average particle size as commonly used; the same applies to the average particle size of said blast furnace slag.

Cement is preferably Portland cement 52.2N, although other kinds of cement may be used as well.

After at least partially hardening said concrete so as to obtain a green hardness, which means that said concrete has no flowing character and will remain its shape when and after being removed from said mold, the layered tile is removed from the mold and left to harden. It may be placed inside a climate chamber at a predetermined temperature and humidity. Such climate treatment may last for, for example, 24 hours. The tile is positioned with its concrete layer top side when hardening same, for example inside said climate chamber.

After hardening said concrete, the layered tile is transported to a packaging station and stacked, wherein a cushioning protection layer is placed in between every layered tile in said stack so as to ensure the tiles are not damaged. When said concrete is sufficiently, preferably fully, hardened said layered tile may be stacked with its ceramic side on top.

Figure 1:
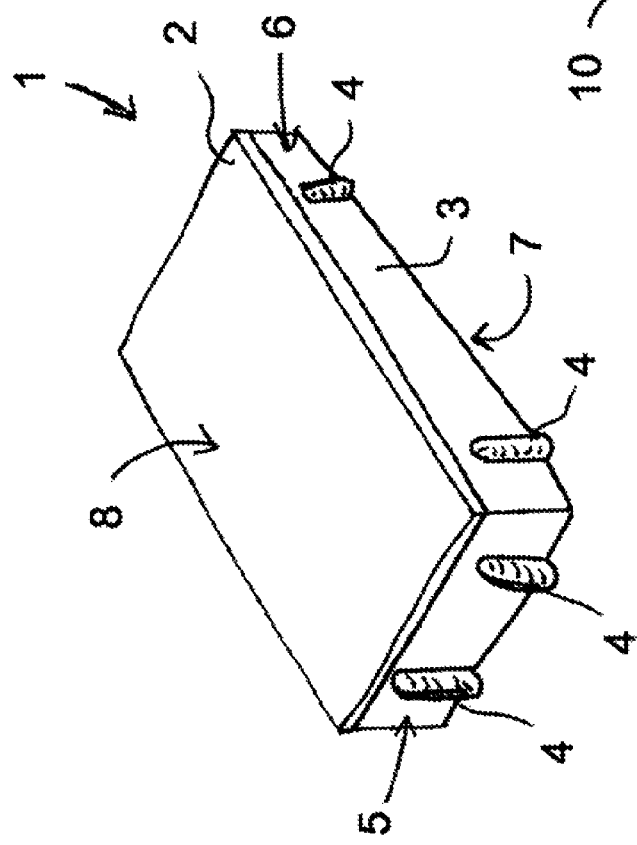
FIG. 1 shows a simplified perspective view of a tile according to the invention.

FIG. 1 shows a layered tile 1 according to the invention, comprised of a ceramic tile 2 and a concrete body 3. The concrete body 3 comprises spacers 4. The spacers 4 consist in the embodiment shown in the figure, of protrusions at side walls 5, 6 of said layered tile. In the embodiment of FIG. 1, the spacers 4 end at some distance from the ceramic tile 2, which means that the spacers do not extend until the ceramic tile 2. However, according to an alternative embodiment, the layered tile 1 according to the invention may be embodied such that the spacers 4 do extend until the ceramic tile 2. Furthermore, the spacers 4 extend to the bottom 7 of the tile 1, whereas the spacers may extend over part of the side walls 5, 6 only, i.e., not extending to said bottom 7. When in use, the ceramic tile 2 is positioned at the layered tile's top side 8.

A mold 9 for manufacturing a tile 1 according to the invention is shown in FIG. 2. As a matter of fact, said mold 9 is shown in an upside-down fashion. When manufacturing a layered tile 1, said mold 9 is positioned with its bottom side 10 on a flat, optionally compressible, surface after which a ceramic tile 2 is positioned within the mold 9, its side walls preferably close to the side edges 11, 12, 13, 14 of said mold 9. Then, a concrete mixture is poured into said mold 9 and allowed to set sufficiently for removing said tile 1 from the mold 9 without damaging same. Then, the tile 1 is removed from the mold 9 and allowed to fully set.

The invention is not limited to the embodiment described above. The invention is limited only by the appending claims.

The invention also comprises every combination of features that are mentioned here independently from each other.

What is claimed is:

1. A layered tile for use in gardens and on terraces comprising:
    a ceramic tile;
    a concrete body;
    said ceramic tile and said concrete body mutually connected;
    an organic primer, said organic primer disposed on a first surface of said ceramic tile;
    said organic primer directly coupling said ceramic tile to said concrete body, wherein the only material between said ceramic tile and said concrete body is said organic primer;
    said concrete body comprising at least two side walls;
    one or more spacers, said one or more spacers formed on at least one of said at least two side walls of said concrete body, each of said one or more spacers protruding from a remaining portion of its respective side wall of said concrete body; and
    said ceramic tile comprising at least two side-edges, each of said at least two side-edges substantially coplanar with a respective one of said at least two side walls of said concrete body.

2. The layered tile of claim 1 wherein said concrete body comprises concrete having an open structure.

3. The layered tile of claim 1 wherein said concrete body comprises as an aggregate at least one of sand, a granulate other than sand, cement, and blast furnace slag.

4. The layered tile of claim 3 wherein said granulate other than sand comprises an average particle dimension of between 2 mm and 8 mm.

5. The layered tile of claim 3 wherein said aggregate comprises said sand in an amount of between 15% and 30% weight basis; said granulate other than sand in an amount of between 55% and 75% weight basis; said cement in an amount of between 4% and 12% weight basis; and said blast furnace slag in an amount of between 2% and 6% weight basis.

6. The layered tile of claim 5 wherein said aggregate comprises said sand in an amount of between 20% and 25% weight basis; said granulate other than sand in an amount of between 62% and 69% weight basis; said cement in an amount of between 6% and 10% weight basis; and said blast furnace slag in an amount of between 3% and 5% weight basis.

7. The layered tile of claim 1 wherein said concrete body is formed from a non-liquid mixture of concrete.

8. The layered tile of claim 1 wherein said one or more spacers comprises at least two spacers formed on at least one side wall of said concrete body.

9. The layered tile of claim 8 wherein said one or more spacers comprises at least two spacers formed on each of said at least two side walls of said concrete body.

10. A layered tile for use in gardens and on terraces comprising:
   a ceramic tile;
   a concrete body;
   said ceramic tile and said concrete body mutually connected;
   an organic primer, said organic primer disposed on a first surface of said ceramic tile;
   said organic primer directly coupling said ceramic tile to said concrete body, wherein the only material between said ceramic tile and said concrete body is said organic primer;
   said concrete body comprising at least two side walls;
   one or more spacers, said one or more spacers formed on at least one of said at least two side walls of said concrete body, each of said one or more spacers protruding from a remaining portion of its respective side wall of said concrete body;
   said ceramic tile comprising at least two side-edges, each of said at least two side-edges substantially coplanar with a respective one of said at least two side walls of said concrete body;
   said concrete body comprising an aggregate; and
   said aggregate comprising at least one of:
      sand, said sand comprising an average particle dimension of maximally 4 mm; and
      a granulate other than sand, said granulate other than sand comprising an average particle dimension of between 2 mm and 8 mm;
      cement; and
      blast furnace slag.

11. The layered tile of claim 10 wherein said concrete body comprises concrete having an open structure.

12. The layered tile of claim 10 wherein said aggregate comprises said sand in an amount of between 15% and 30% weight basis; said granulate other than sand in an amount of between 55% and 75% weight basis; said cement in an amount of between 4% and 12% weight basis; and said blast furnace slag in an amount of between 2% and 6% weight basis.

13. The layered tile of claim 12, wherein said aggregate comprises said sand in an amount of between 20% and 25% weight basis; said granulate other than sand in an amount of between 62% and 69% weight basis; said cement in an amount of between 6% and 10% weight basis; and said blast furnace slag in an amount of between 3% and 5% weight basis.

14. The layered tile of claim 10 wherein said concrete body is formed from non-liquid mixture of concrete.

15. The layered tile of claim 10 wherein said one or more spacers comprises at least two spacers on at least one of said at least two side walls of said concrete body.

16. The layered tile of claim 15 wherein said one or more spacers comprises at least two spacers on each of said at least two side walls of said concrete body.

17. A layered tile for use in gardens and on terraces comprising:
   a ceramic tile;
   a concrete body;
   said ceramic tile and said concrete body mutually connected;
   an organic primer, said organic primer disposed on a first surface of said ceramic tile;
   said organic primer directly coupling said ceramic tile to said concrete body, wherein the only material between said ceramic tile and said concrete body is said organic primer;
   said concrete body comprising at least two side walls;
   one or more spacers, said one or more spacers formed on one or more side at least two side walls of said concrete body, each of said one or more spacers protruding from a remaining portion of its respective side wall of said concrete body;
   said ceramic tile comprising at least two side-edges, each of said at least two side-edges substantially coplanar with a respective one of said at least two side walls of said concrete body;
   said concrete body comprising an aggregate; and
   said aggregate comprising at least one of:
      sand in an amount of between 15% and 30% weight basis;
      a granulate other than sand in an amount of between 55% and 75% weight basis;
      cement in an amount of between 4% and 12% weight basis; and
      blast furnace slag in an amount of between 2% and 6% weight basis.

18. The layered tile of claim 17 wherein said concrete body comprises concrete having an open structure.

19. The layered tile of claim 17 wherein said one or more spacers comprises at least two spacers formed on at least one of said at least two side walls of said concrete body.

20. The layered tile of claim 19 wherein said one or more spacers comprises at least two spacers formed on each of said at least two side walls of said concrete body.

* * * * *